(12) United States Patent
Hoyle

(10) Patent No.: US 7,498,534 B2
(45) Date of Patent: Mar. 3, 2009

(54) KEYPAD LIGHT GUIDE

(75) Inventor: Charles D. Hoyle, Stillwater, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 72 days.

(21) Appl. No.: 11/468,522

(22) Filed: Aug. 30, 2006

(65) Prior Publication Data

US 2008/0053800 A1  Mar. 6, 2008

(51) Int. Cl.
*H01H 9/00* (2006.01)

(52) U.S. Cl. .................................................. 200/314

(58) Field of Classification Search ......... 200/310–314, 200/341–345, 512–520; 362/626
See application file for complete search history.

(56) References Cited

U.S. PATENT DOCUMENTS

| | | | |
|---|---|---|---|
| 5,005,108 A | | 4/1991 | Pristash et al. |
| 5,128,842 A | * | 7/1992 | Kenmochi ................. 200/314 |
| 5,491,313 A | | 2/1996 | Bartley et al. |
| 5,613,751 A | | 3/1997 | Parker et al. |
| 5,905,826 A | * | 5/1999 | Benson, Jr. et al. ......... 362/554 |
| 5,975,711 A | | 11/1999 | Parker et al. |
| 6,079,838 A | | 6/2000 | Parker et al. |
| 6,158,867 A | | 12/2000 | Parker et al. |
| 6,167,182 A | | 12/2000 | Shinohara et al. |
| 6,217,183 B1 | | 4/2001 | Shipman |
| 6,752,505 B2 | | 6/2004 | Parker et al. |
| 6,755,561 B2 | | 6/2004 | Kluser |
| 6,861,600 B1 | * | 3/2005 | Schulz et al. ............... 200/314 |
| 6,926,418 B2 | | 8/2005 | Ostergard et al. |
| 6,929,391 B2 | | 8/2005 | Hotelling |
| 6,950,680 B2 | | 9/2005 | Kela et al. |
| 7,294,803 B2 | | 11/2007 | Lee et al. |
| 2005/0024849 A1 | | 2/2005 | Parker et al. |
| 2005/0259440 A1 | | 11/2005 | Onishi et al. |
| 2005/0259939 A1 | | 11/2005 | Rinko |

(Continued)

FOREIGN PATENT DOCUMENTS

JP    2001-358816    12/2001

(Continued)

OTHER PUBLICATIONS

U.S. Appl. No. 11/318,707, entitled "Cutting Tool Using Interrupted Cut Fast Tool Servo," filed Dec. 27, 2005.

*Primary Examiner*—Edwin A. Leon
(74) *Attorney, Agent, or Firm*—Lance L. Vietzke

(57) ABSTRACT

A light guide for lighting keys of a keypad in handheld devices. The light guide includes a film and a light emitting diode optically coupled to it. The film provides for substantial total internal reflection of light. A surface of the film opposite the keys includes a plurality of discrete areas, and each of the areas has one or more microstructured features such that each of them extract from the film a substantial amount of light incident upon them by reflecting and redirecting the light such that it impinges upon the film beyond the critical angle for total internal reflection. The microstructured features in each of the areas are adjusted such that they obtain substantially uniform extraction of light from the light source. The light guide can provide sufficient illumination of the keys using only a single light emitting diode as the light source.

17 Claims, 2 Drawing Sheets

U.S. PATENT DOCUMENTS

2007/0127267 A1 * 6/2007 Chen .......................... 362/626

FOREIGN PATENT DOCUMENTS

| JP | 2002-300258 | 10/2002 |
| KR | 10-2006-0021966 | 3/2006 |
| KR | 10-0606081 | 7/2006 |
| KR | 10-0606082 | 7/2006 |

* cited by examiner

KEYPAD LIGHT GUIDE

FIELD OF INVENTION

The present invention relates to a light guide for use in illuminating the keys of a handheld device and using, in certain embodiments, only one light emitting diode or other light source for the illumination.

BACKGROUND

Handheld devices contain keys or buttons for a user to enter commands or information into the devices. For example, cellular or mobile phones contain keys in a keypad for a user to enter phone numbers. These devices use multiple light emitting diodes (LEDs) to light the keys with a sufficient intensity so that a user may see them in dark or dimly lit conditions. One trend in handheld devices involves making them smaller (or thinner) and more lightweight, features also desired by consumers. Therefore, it would be desirable to reduce the number of LEDs used in handheld devices, which would reduce the size and cost of keypads for the handheld device.

SUMMARY OF INVENTION

A light guide, consistent with the present invention, includes a light source optically coupled to a film having a first surface and a second surface opposing the first surface, together providing for substantial total internal reflection of light. The first surface includes a plurality of discrete areas, and each of the areas has one or more microstructured features such that each of them extract from the film a substantial amount of light incident upon them, and the microstructured features in each of the areas are adjusted such that they obtain substantially uniform extraction of light from the light source.

A method for making a light guide, consistent with the present invention, includes the following steps: providing a film having a first surface and a second surface opposing the first surface, together providing for substantial total internal reflection of light; optically coupling a light source to the film; and forming a plurality of discrete areas on the first surface. Each of the areas has one or more microstructured features such that each of the areas extract from the film a substantial amount of light incident upon them, and the microstructured features in each of the areas are adjusted such that each area obtains substantially uniform extraction of light from the light source.

A keypad unit for a handheld device, consistent with the present invention, includes a keypad having a plurality of keys, a reflector having a first side and a second side opposing the first side, a contact plate located against the second side of the reflector and having a plurality of contacts providing electrical signals in response to activation of the keys, and a light guide located between the keypad and the first side of the reflector. The light guide includes a light source optically coupled to a film having a first surface and a second surface opposing the first surface, together providing for substantial total internal reflection of light. The light guide first surface includes a plurality of discrete areas, and each of the areas has one or more microstructured features such that each of them extract from the film a substantial amount of light incident upon them, and the microstructured features in each of the areas are adjusted such that each area obtains substantially uniform extraction of light from the light source.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Embodiments of the present invention include a light guide for lighting a keypad for a handheld device such as a mobile phone. In certain embodiments, a single LED or other light source injects light into the light guide, which extracts the light with microstructured features beneath the keys. The microstructured features extract light predominately by total internal reflection (TIR). Light that is not extracted by a first encounter with a microstructured feature can be recycled by the microstructured features and an optional reflector beneath the light guide and extracted by a subsequent encounter with a microstructured feature. The microstructured features can be sections of circular or spiral arcs, for example, with the light from the LED extracted preferably at the center of all the arcs or at other locations along the arcs, or the microstructured features can be lenslets arrayed, for example, in a rectangular or hexagonal pattern, or other regular or irregular pattern. Within each extraction area of the light guide, the microstructured features can be continuous, for example arcs or prisms, or they can be discontinuous, for example regular or irregular patterns of lenslets or other microstructured features. A system and method to make discontinuous microstructured features is described in U.S. patent application Ser. No. 11/318707, entitled "Cutting Tool Using Interrupted Cut Fast Tool Servo," and filed Dec. 27, 2005, which is incorporated herein by reference as if fully set forth.

The pitch between the microstructured features in each of the areas having them can be optimized to provide efficient and substantially uniform lighting of the keys. Alternatively or in addition, the height of the microstructures can be so optimized. If discrete microstructures such as lenslets are used, spacing between individual lenslets can also be optimized. Certain embodiments can light all the keys on a keypad with only one LED, reducing the cost and size of the keypad compared to keypads requiring more than one LED for the light source. In other embodiments, more than one light source is used with the light guide.

Figure 1:
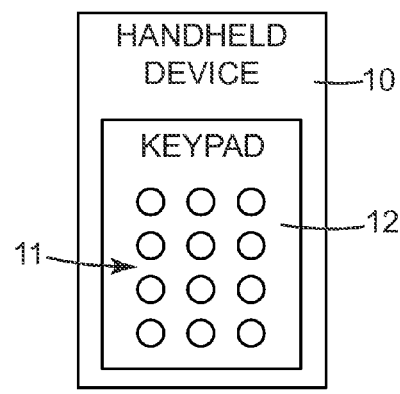
FIG. 1 is a diagram representing a handheld device with a lighted keypad.

FIG. 1 is a diagram representing a handheld device 10 with a keypad 12 and shows an exemplary layout of keys 11 on the keypad. A keypad can include any number and layout of keys. A user activates the keys, such as by pressing down on them, in order to enter information or commands into handheld device 10. For example, if handheld device 10 is a mobile phone, the keypad typically includes twelve keys, one each for the numbers 0-9 and the symbols "*" and "#." Handheld device 10 can include any type of handheld device having a keypad. The keypad typically includes a way to illuminate each of the keys so that a user can see and identify them in dark or dimly lit conditions.

Figure 2:
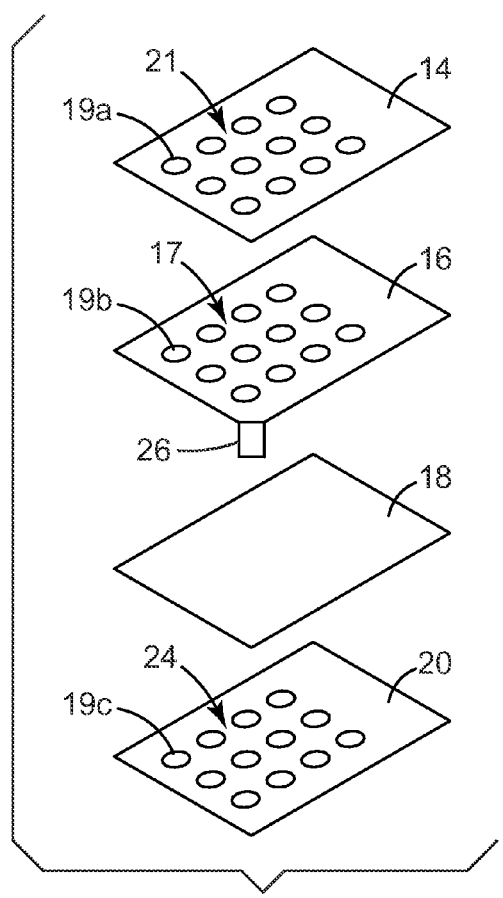
FIG. 2 is an exploded diagram illustrating a construction of a lighted keypad unit.

FIG. 2 is an exploded diagram illustrating a construction of a lighted keypad unit, corresponding with keypad 12 in handheld device 10. The keypad unit in this exemplary embodiment includes the following components: a keypad housing 14 containing a plurality of keys 21; a light guide film 16 having a plurality of microstructured features 17 for light extraction; a light source 26 optically coupled to film 16; an optional reflector 18; and a contact plate 20 having a plurality of contacts 24. Each of the keys 21 is illuminated by the microstructured features within each of the areas 17 and activates one of the contacts 24. For example, key 19a is illuminated by microstructured features in area 19b directing light from light source 26, and when key 19a is depressed it activates contact 19c for entering information or a particular command into handheld device 10. The keys 21, microstructured features 17, and contacts 24 are shown in FIG. 2 as a four by three matrix of circles for illustrative purposes only. A keypad can have any configuration and number of keys, microstructured features, and contacts, and they can each be formed in various other shapes, for examples rectangles, triangles, ellipses, polygons, or other shapes.

Keypad housing 14 is typically implemented with a plastic material housing each of the keys 21, also comprised of a plastic material. Alternatively, other materials can be used for implementing housing 14 and keys 21. Keypad housing 14 provides for movement of each of the keys 21 so that they can activate the contacts 24 when depressed.

Film 16 can be implemented with, for example, a polymer microstructured film configured for TIR and for extraction of light at the microstructured features. The microstructured features can include any type of micron-scaled feature providing for light extraction such as lenslets, prisms, or other geometric configurations. The micron-scaled features typically have, although need not require, at least one dimension (height, width, or length) less than one millimeter. The microstructured features 17 can be made in film 16 by a variety of techniques. Typically, a metal tool is first machined to make negative microstructured features in the tool. For example, the tool can be machined by wire electrical discharge machining, diamond turning machining, flycutting, milling, grinding, engraving, or etching. The film is then made by applying a viscous material to the tool, curing it or allowing it to cure, and removing it from the tool. Therefore, negative features in the tool (e.g., an indentation) results in a positive feature in the film (e.g., protrusion). In this case, the microstructured features are indentations in the film, and the film can be directly machined to create the microstructured features as indentations, preferably arcs. Alternatively, the film can be made using a second generation of tooling involving machining a first tool to make indentations, using the first tool to make a second tool having protrusions, and then making a film from the second tool to create indented microstructured features in the film.

Examples of materials for implementing film 16 include an optical film having the following parameters: a thickness t=0.250 millimeters (mm)-0.600 mm; an index of refraction n=1.4-1.6; and a power absorption coefficient α<0.01/centimeter (cm). Films having different parameters can also be used. An example of one such optical film is polyethylene terephthalate (PET), although any optical film capable of TIR can be used. The thickness of film 16 may depend upon the size of the LED coupled to it, when an LED is used as the light source. Otherwise, if the size of the LED does not limit the film thickness, when an LED is used as the light source, then the light guide thickness would only be limited by the wavelength of the light from the LED and the index of refraction of the film.

Reflector 18, when used, can be implemented with any material providing for substantial reflection of light incident upon it. For example, it can be implemented with a polished metal material. Examples of materials for implementing reflector 18 include the Enhanced Specular Reflector (ESR) film available from 3M Company and having a reflectance value R>0.95 and a thickness t=0.100 mm-0.200 mm.

Light source 26 is optically coupled with film 16 for transmission of light into film 16. For example, light source 26 can be secured to a chamfered corner or other edge or proximate edge location of film 16 using an optical adhesive. The light source 26 is also electrically coupled to a power source, such as a battery in handheld device 10, for supplying power to it. Examples of light sources for implementing light source 16 include LEDs, edge-emitting LEDs, organic LEDs (OLEDs), or other point sources of light. Light source 26 can be coupled to film 16 using an index matching material, and the light source can have a microstructured surface to improve coupling. Also, an air gap can be formed between light source 26 and film 16. As an alternative to the corner location, the light source can be located at other locations, including on a centerline of the keys. Also, more than one light source can be used, each located anywhere along the edge of the light guide as determined, for example, by user constraints and a layout of the keys. As an example, if a single light source does not provide for an optimal or desired design for a particular keypad, then additional light sources can be introduced into the design until a desired level of brightness and uniformity is achieved.

Contact plate 20 is typically implemented with a plastic material housing each of the contacts 24, and it can alternatively be implemented with other types of materials. Physical pressure on the contacts 24 via the keys 21 provides an electrical signal corresponding to the key depressed. The electrical signals corresponding to the keys are received and processed by other components within handheld device 10.

The keypad housing 14, film 16, optional reflector 18, and contact plate 20 can be held together to form keypad 12 in a variety of ways. For example, those components can be clamped together at the edges or otherwise held together using physical pressure within a housing for handheld device 10. Those components can also be laminated together with adhesive tabs or strips.

Figure 3:
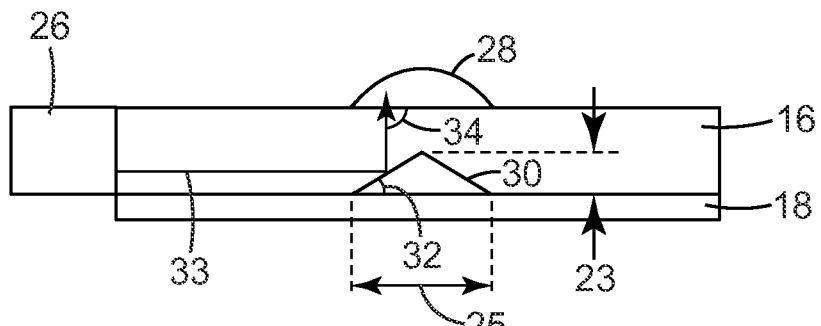
FIG. 3 is a side view illustrating extraction of light from a microstructured film to illuminate a key.
Figure 4:
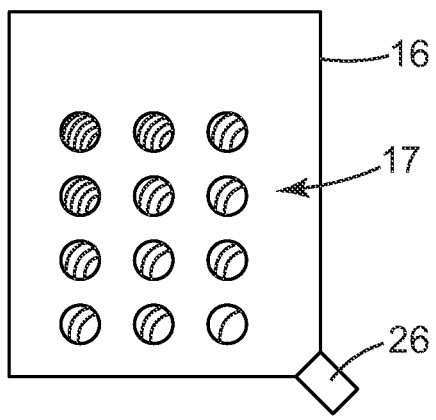
FIG. 4 is a top view illustrating a film with microstructured features within particular discrete areas to light keys of a keypad.

FIG. 3 is a side view illustrating an area having a microstructured feature 30 in film 16 with reflector 18 and light source 26 for lighting keypad 12 in an exemplary embodiment. FIG. 4 is a top view illustrating film 16 with areas 17 each having microstructured features and light source 26. The areas to be lit, as shown in FIGS. 3 and 4, are the circles below the keys so the keys can be read in dark or dimly lit conditions. Lighting of the entire plane of the light guide (film 16) is not desired. Extracted light is desired at the location of keys 21 with an appropriate fraction of the light extracted at each of the microstructured features 17 so that light may propagate to all keys and provide substantially uniform lighting of them or lighting of them within a particular range of illumination. The pitch among the microstructured features in each of the areas can be adjusted to provide for substantially uniform extraction of light among the microstructured features 17 for substantially uniform illumination of keys 21 or illumination within a particular range. In addition to or as an alternative to adjusting pitch, the size and shape of the microstructured features can also be adjusted to optimize or control light extraction at a location of any key.

In the exemplary configuration shown in FIG. 3, each microstructured feature, for example feature 30, is cut at a 45° angle (32) into film 16. A light ray 33 from light source 26 impinges upon microstructured feature 32 and is reflected upward to light key 28. Due to the direction of reflection, light ray 33 impinges upon the top surface of film 16 at approximately a 90° angle (34), beyond the critical angle for TIR, allowing the light to escape from the film rather than being reflected in it. A minor amount of light may leak through the bottom of the film at the reflection by microstructured feature 32, and reflector 18 thus provides for reflecting the leakage of light back into film 16. In an exemplary embodiment and in order to match light source 26, film 16 has a thickness t=0.250 mm-0.600 mm. Also in an exemplary embodiment, the arcs (microstructured features 30) have a depth 23 of 0.007 mm, a width 25 of 0.014 mm, and are cut at an angle 32 of 45°. Other depths and angles of the microstructured features are possible in order for the features to reflect and redirect light beyond the critical angle for TIR such that the light can traverse through the film and illuminate the keys.

FIG. 3 is intended as only an example of a configuration of microstructured features under keys in order to illuminate them. Other exemplary embodiments can include different microstructured features other than or in addition to arcs, a different configuration of the microstructured features, different dimensions (height, length, and width) of the microstructured features, and different materials or thicknesses of the microstructured film.

Figure 5:
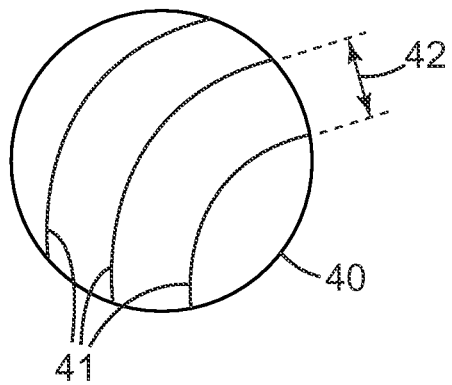
FIG. 5 is a top view of microstructured features in a particular area of a film and having a particular pitch.

FIG. 5 is a top view of microstructured features in a particular area 40 of film 16 for use in lighting a key of a keypad in this exemplary embodiment. Area 40 corresponds with one of the areas 17, and arcs 41 correspond with microstructured feature 30. A pitch 42 refers to the spacing between the microstructured features 41 in each of the areas. In an exemplary embodiment the pitch decreases as the distance between the areas and the light source increases, although in other embodiments the pitch can be arranged in other ways. Also, in certain embodiments the arcs are cut facing the light source such that the light impinges upon them at approximately right angles to enhance reflection upward to light the key. Alternatively, the microstructured features need not be arcs and can be formed in the film in various other shapes or configurations. For example, the microstructured features can be implemented as cones, pyramids, lenslets, or other shapes that can be optimized in size and layout for extraction of light under the keys using one or more light sources. The pitch of the microstructured features can be constant or varying at each area in the film to be located under a key, and the arcs can be cut or formed in spirals or concentric rings, for example, or other configurations such as grids of varying pitch depending on the symmetry of the extractor. In addition, the size and shape of the microstructured features can also be adjusted to control light extraction. Also, the microstructured features in area 40 can be continuous or discontinuous. A discontinuous microstructured feature can include, for example, one or more of the arcs 41 having one or more flat portions along it.

Figure 6:
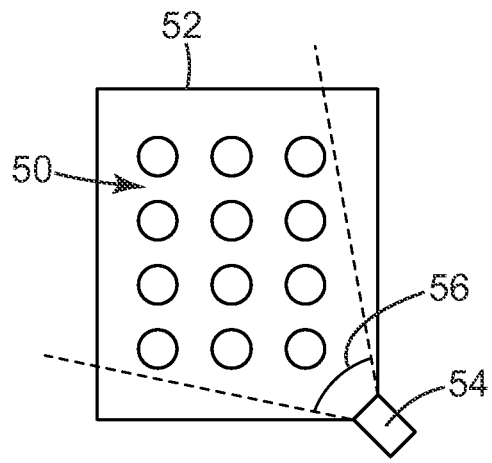
FIG. 6 is a top view illustrating use of a single light source to light all keys of a keypad when those keys are situated within a particular angular distribution with respect to the light source.

FIG. 6 is a top view illustrating use of a single light source 54 to light all keys 50 of a keypad 52 when those keys are located within a particular angular distribution 56 with respect to the light source. In particular, modeling has shown that only one light source is needed when all keys to be illuminated are within a cone of 60° or less (angular distribution 56).

A variety of techniques are available to obtain the appropriate microstructured features pitch to obtain the desired light extraction. For example, optical modeling or empirical evidence can be used to obtain the desired parameters of the film for a desired light extraction. For optical modeling, ray tracing software such as the ASAP program (available from Breault Research, Tucson, Ariz., U.S.A.) and the iSIGHT optimization software program (available from Engineous Software, Cary, N.C., U.S.A.) can be used to obtain the desired pitch of the microstructured features in each area for desired lighting. The film can be designed through these techniques to provide for substantially uniform extraction of light among the microstructured features. Alternatively, the film can be designed using these techniques to provide for the intensity of the extracted light among the microstructured features being within 10% of a particular intensity value or within other ranges. A pitch value can be generated for each area based upon a desired light extraction, a layout of keys on the keypad, and a location of the one or more light sources. The pitch values can be used to machine the microstructured features in the areas corresponding to lighting of each of the keys.

While the present invention has been described in connection with an exemplary embodiment, it will be understood that many modifications will be readily apparent to those skilled in the art, and this application is intended to cover any adaptations or variations thereof. For example, various types of materials for the film and dimensions of the microstructured features in the film may be used without departing from the scope of the invention. This invention should be limited only by the claims and equivalents thereof.

The invention claimed is:

1. A light guide, comprising:
    a film having a first surface and a second surface opposing the first surface, wherein the first and second surfaces provide for substantial total internal reflection of light;
    a single light source optically coupled to the film in order to inject light into the film between the first and second surfaces; and
    a plurality of discrete areas on the first surface, wherein each of the areas has one or more microstructured features such that each of the areas extract from the film a substantial amount of light incident upon the areas, and wherein the microstructured features in each of the areas are adjusted such that the areas obtain substantially uniform extraction of light among all of the areas from the single light source.

2. The light guide of claim 1, further comprising a reflector coupled to the film on the side having the second surface.

3. The light guide of claim 1, wherein the light source is optically coupled at a chamfered corner of the film.

4. The light guide of claim 1, wherein the areas are arranged to extract the light to illuminate keys of a keypad.

5. The light guide of claim 1, wherein each of the microstructured features in each of the areas comprises a microstructured arc.

6. The light guide of claim 1, wherein the light source comprises only one light emitting diode.

7. A method for making a light guide, comprising:
    providing a film having a first surface and a second surface opposing the first surface, wherein the first and second surfaces provide for substantial total internal reflection of light;

optically coupling a single light source to the film in order to inject light into the film between the first and second surfaces; and forming a plurality of discrete areas on the first surface, wherein each of the areas has one or more microstructured features such that each of the areas extract from the film a substantial amount of light incident upon the areas, and wherein the microstructured features in each of the areas are adjusted such that the areas obtain substantially uniform extraction of light among all of the areas from the single light source.

8. The method of claim 7, further including coupling a reflector to the film on the side having the second surface.

9. The method of claim 7, wherein the coupling step includes the step of optically coupling the light source at a chamfered corner of the film.

10. The method of claim 7, wherein the forming step includes arranging the areas to extract the light to illuminate keys of a keypad.

11. The method of claim 7, wherein the forming step includes forming microstructured arcs in each of the areas of the film.

12. The method of claim 7, wherein the coupling step comprises using only one light emitting diode as the light source.

13. A keypad unit for a handheld device, comprising:

a keypad having a plurality of keys;

a reflector having a first side and a second side opposing the first side;

a contact plate located against the second side of the reflector and having a plurality of contacts providing electrical signals in response to activation of the keys; and a light guide located between the keypad and the first side of the reflector, the light guide comprising:

a film having a first surface and a second surface opposing the first surface, wherein the second surface reflects a substantial amount of light incident upon the second surface;

a single light source optically coupled to the film in order to inject light into the film between the first and second surfaces; and a plurality of discrete areas on the first surface, wherein each of the areas has one or more microstructured features such that each of the areas extract from the film a substantial amount of light incident upon the areas, and wherein the microstructured features in each of the areas are adjusted such that the areas obtain substantially uniform extraction of light among all of the areas from the single light source.

14. The keypad unit of claim 13, wherein the light source is optically coupled at a chamfered corner of the film.

15. The keypad unit of claim 13, wherein each of the microstructured features in each of the areas comprises a microstructured arc.

16. The keypad unit of claim 13, wherein the areas are all within a 60° cone centered at the light source.

17. The keypad unit of claim 13, wherein the light source comprises only one light emitting diode.

* * * * *